United States Patent Office 2,796,407
Patented June 18, 1957

2,796,407

RUST PREVENTATIVE COMPOSITIONS OF MATTER

Ellis K. Fields, Chicago, Ill., assignor to Standard Oil Company, Chicago, Ill., a corporation of Indiana No Drawing. Application April 18, 1955, Serial No. 502,211

8 Claims. (Cl. 252—51.5)

I have discovered that novel compositions of the type: N-alkyl-N', N'-di(carboxymethyl) urea have a high degree of effectiveness as rust inhibitors in oils. Thus, N-octadecyl-N', N'-di(carboxymethyl) urea, typical of the new compositions, gives perfect protection against rusting when incorporated in a turbine oil base at a concentration of 0.001 percent by weight and tested according to the ASTM D–665 rust test.

The new compositions are characterized structurally by the formula

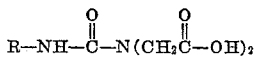

where R is an aliphatic or substituted aliphatic group containing 10 to 40 carbon atoms, preferably in a straight chain.

The octadecyl derivative is a particularly advantageous example because it provides a long straight chain hydrocarbon group which imparts good oil solubility and which, in conjunction with the polar carboxy groups, provides close molecular packing in film formation and unusual film strength. Other higher alkyl derivatives, however, such as the lauryl, dodecyl and hexadecyl derivatives, for example, may be readily produced from available raw materials and are highly effective. It is not strictly essential that the aliphatic group be a straight chain, for other higher hydrocarbon groups such as long chain, but methyl branched, hydrocarbon groups derived by olefin polymerization appear to have value, e. g. polybutenes. Hydrocarbon groups derived from waxes, with or without some ring substitution also appear suitable, and the substitution of an aromatic ring, particularly so that para-orientation of the alkyl and polar groupings results, may enhance oil solubility.

The new compositions may be made by reacting a long chain isocyanate with imino diacetic acid, or preferably, its salts. The use of approximately equimolar proportions at a temperature of about 20° to 100° C. for a reaction period of about 10 minutes to 6 hours is suitable. The reaction may be conducted in the presence or absence of a solvent or diluent, e. g. benzene or a lubricating oil distillate.

In use as rust inhibitors in lubricating oils, the new compositions are advantageously handled in the form of concentrates containing about 10 to 50 percent by weight of the inhibitor. In the finished lubricating oil blends, however, a proportion of about 0.005 to 1 percent by weight ordinarily is sufficient for adequate protection. The finished blends, it will be understood, usually contain the other compatible additives of commercial practice such as pour depressants, anti-foam agents, detergents, viscosity index improvers and the like.

The following example illustrates the preparation of a typical composition according to the invention and its evaluation in lubricating oil blends as a rust inhibitor.

A mixture of 59 grams (0.2 mole) of octadecyl isocyanate and 39 grams (0.2 mole) of disodium imino diacetate monohydrate was stirred and heated slowly. At 75° C. reaction took place with the evolution of heat and the whole mass solidified. It was broken up, dissolved in 500 ml. warm water and neutralized with 25 ml. concentrated hydrochloric acid. The white precipitate was collected on a filter, washed with cold water and dried. Recrystallized from hexane, it melted at 83.5–84° C. The yield was 81 grams, 94% of

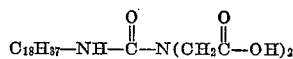

The analysis calculated for $C_{23}H_{44}N_2O_5$ was: C, 64.55; H, 10.28; N, 6.54. Found: C, 64.75; H, 10.26; N, 6.62.

The product was tested in a conventionally refined base oil under the conditions of the ASTM D–665 rust test and the modified film tenacity test. In the ASTM test, a mixture of 300 ml. of the test oil with 30 ml. of distilled water is stirred at a temperature of 140° F. for 24 hours with a cylindrical steel specimen completely immersed therein. The film tenacity test is performed by removing the specimen, replacing the oil with fresh distilled water and repeating under the same conditions of temperature and time. The repeat run affords a basis for distinguishing between anti-rust agents which are effective enough to pass the ASTM test but which may not stand up in service. At 0.001% concentration by weight there was no rusting; at 0.0005% there was slight rusting. In the film tenacity test there was no rusting at 0.001%.

I claim:
1. As a new composition of matter, an N-alkyl-N', N'-di(carboxymethyl) urea in which the alkyl group contains from about 10 to about 40 carbon atoms.
2. N-dodecyl-N', N'-di(carboxymethyl) urea.
3. N-hexadecyl-N', N'-di(carboxymethyl) urea.
4. N-octadecyl-N', N'-di(carboxymethyl) urea.
5. A lubricating oil composition which essentially comprises a major amount of a mineral lubricating oil base and a minor amount of an N-alkyl-N', N'-di(carboxymethyl) urea containing from about 10 to about 40 carbon atoms in the alkyl group sufficient to provide protection against rusting.
6. A lubricating oil composition which essentially comprises a major amount of a mineral lubricating oil base and a minor amount of an N-dodecyl-N', N'-di(carboxymethyl) urea sufficient to provide protection against rusting.
7. A lubricating oil composition which essentially comprises a major amount of a mineral lubricating oil base and a minor amount of an N-hexadecyl-N', N'-di(carboxymethyl) urea sufficient to provide protection against rusting.
8. A lubricating oil composition which essentially comprises a major amount of a mineral lubricating oil base and a minor amount of an N-octadecyl-N', N'-di(carboxymethyl) urea sufficient to provide protection against rusting.

References Cited in the file of this patent
UNITED STATES PATENTS

| 2,605,285 | Schultze | July 29, 1952 |
| 2,636,045 | Halpern | Apr. 21, 1953 |
| 2,698,300 | Hotten | Dec. 28, 1954 |